Nov. 4, 1930.  J. R. MOORE  1,780,834
CHAIN CARRIER AND PULL
Filed Aug. 25, 1927   2 Sheets-Sheet 2
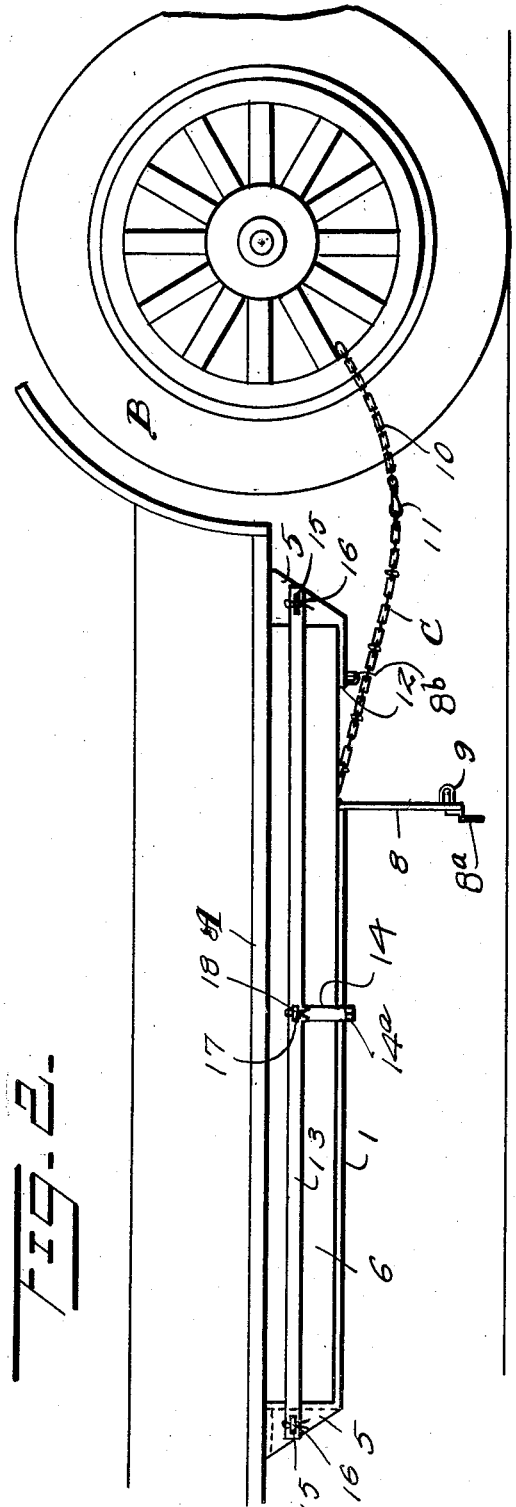
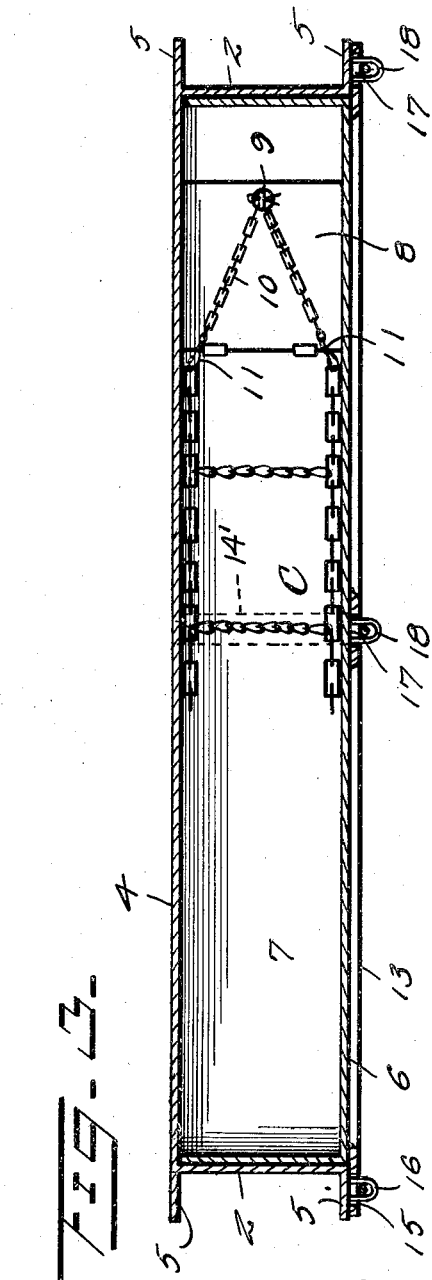
Inventor
J. R. Moore
Attorney Patented Nov. 4, 1930

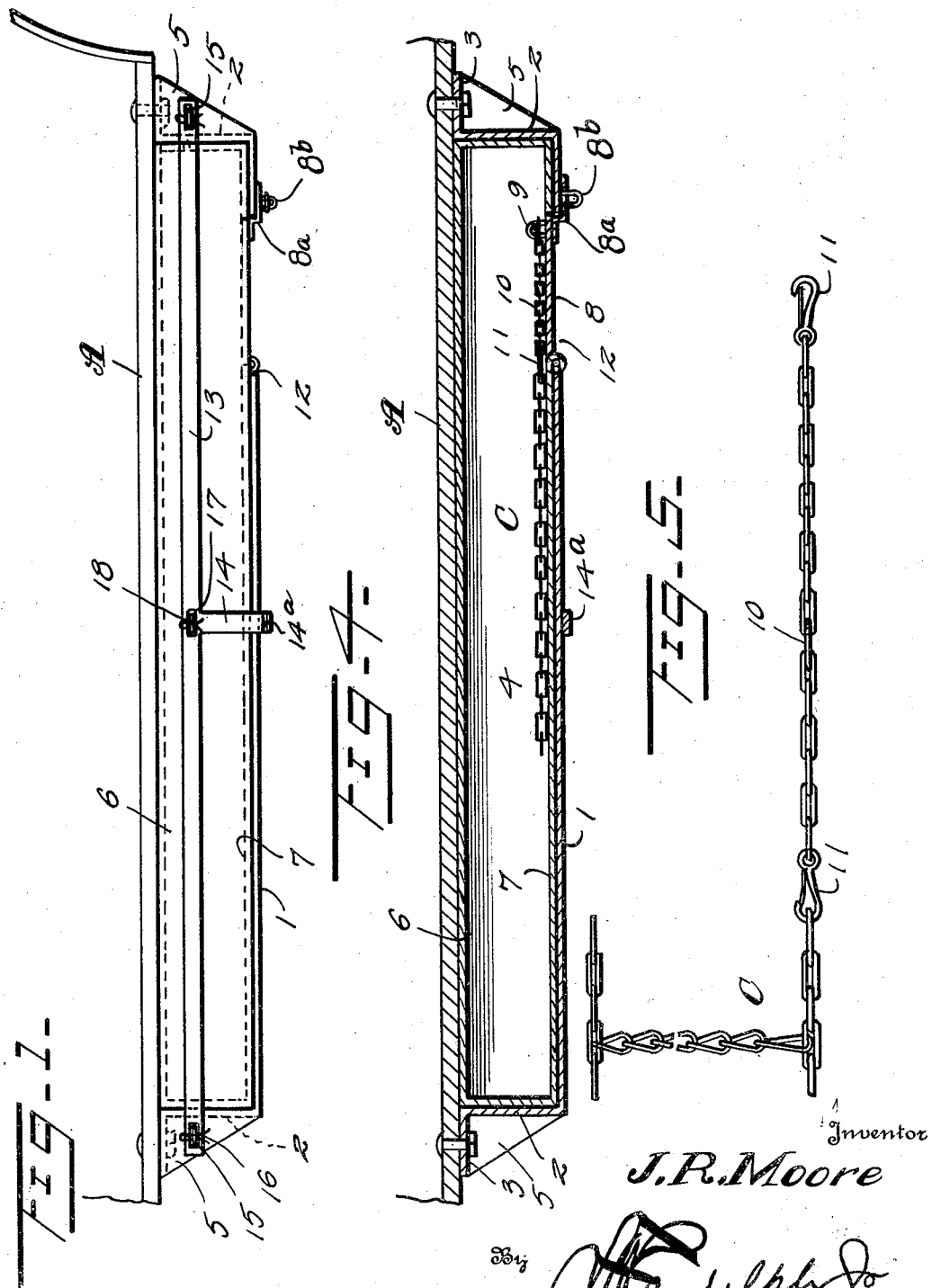

1,780,834

UNITED STATES PATENT OFFICE

JAMES R. MOORE, OF SPRINGFIELD, COLORADO

CHAIN CARRIER AND PULL

Application filed August 25, 1927. Serial No. 215,401.

The invention relates to handy and convenient means for carrying the anti-skid chains for automobile wheels and has for its object the provision of a hanger adapted to be secured to the under side of the running board of a motor vehicle at each side thereof, and to receive a container in which the chain is stored, said container having a door in its bottom opening downwardly and adapted to be connected to one end of the tire chain so that when the door is open the end of the tire chain will be delivered from the container, a puller chain being connected to the end of the tire chain for this purpose, and adapted to be secured to the driving wheel to place the chain in position thereon.

The invention will be described in detail hereinafter and will be found illustrated in the accompanying drawings in which Figure 1 is a side view of the chain carrier showing it applied to the running board of a motor vehicle, Figure 2 is a view similar to Figure 1 showing the manner of applying the chain to a wheel, Figure 3 is a horizontal sectional view of the container, Figure 4 is a longitudinal vertical sectional view, and Figure 5 is a detail view of the puller chain showing it attached to the end fragment of the tire chain.

In the drawings similar reference characters will be uesd to designate corresponding parts throughout the several views.

In the drawings a hanger is shown applied to one side of an automobile running board designated A, B designating the driving wheel of the vehicle on the corresponding side thereof, it being understood that the device is to be made in rights and lefts for attachment to the two sides of the vehicle, the chain for each side being carried in the container to be hereinafter described.

The invention consists in the provision of a hanger having a base 1 provided with end upright members 2 having outwardly extending horizontal flanges 3 adapted to be secured to the under side of the running board A by bolts or other suitable fastening means.

4 indicates a back wall member that is secured to the base 1, uprights 2 and horizontal flanges 3, the ends of said back wall 4 serving to brace the uprights 2 and the horizontal flanges 3. 5 are angular brace members secured to the outer or front edges of the uprights 2 and the horizontal flanges 3 and serve also to support these members. 6 indicates a container for the tire chain designated C being of substantially the correct dimensions to snugly receive the tire chain and prevent it from moving after being placed in the container so that it may be delivered in proper condition for securing to the wheel of the vehicle, as will be more clearly described hereinafter. The bottom wall 7 of the container 6 is provided with a hinged door 8 that is mounted to swing downwardly and to be secured in closed position by any suitable fastening means. The door 8 is provided with a hasp $8^a$ to engage a staple $8^b$ on the hanger to hold it in closed position, and with a staple 9 that is adapted to engage a length of puller chain 10 and to be secured to the chain by means of a pin or other suitable fastening means. The puller chain 10 is provided with snap hooks 11 on its ends that engage in links of the side chain C, so that when the door 8 is released to swing downwardly the puller chain 10 being secured to the staple 9 will be delivered from the container and with it the end of the tire chain.

The container 6 is proportioned to snugly fit in the hanger hereinbefore described, and to rest on the base 1, said base being provided with an opening 12 alined with the door 8 to permit downward swinging of the door as hereinbefore referred to. The container 6 is held in place on the base 1 of the hanger by means of a horizontal rod 13 having a laterally extending arm 14 that hingedly engages the transverse strap 14', as shown at $14^a$, secured under the base 1 said horizontal bar 13 being provided with slotted openings 15 adjacent to its ends to receive staples 16 on members 5 and a slotted opening 17 to receive a staple 18 on the container 6, said staples being adapted to receive padlocks or other suitable fastening members to hold the container in position on the hanger.

In using the improved structure, after the door 8 is opened to deliver an end of the tire chain C from the container by the secured puller chain 10, the chain 10 being released from the staple 9 will be used to run the chain on the tire, this being accomplished by releasing one of the snap hooks 11 temporarily from engagement with the tire chain and securing it around the spokes of the driving wheel B. Then by moving the vehicle forward with the engine driven at slow speed, the chain will be mounted on the tire in an expeditious manner.

What is claimed is:—

1. In a tire chain carrier, a hanger adapted to be secured to a motor vehicle running board and consisting of a base member having an opening therein adapted to aline with an opening in a tire chain container and through which a closure for the opening in the container is actuable, flanges offset from the base member for supporting the hanger on the running board, angular brace members at the ends of said hanger, a transverse strap secured to the base member, an arm hingedly secured to said strap, and a horizontal rod supported by said arm and provided with means to secure it to the angular brace members and to the container.

2. In a tire chain carrier, a hanger adapted to be secured to a motor vehicle running board and consisting of a base member having an opening therein adapted to aline with an opening in a tire chain container and through which a closure for the opening in the container is actuable, means on said case to secure the closure in closed position, upright members on the ends of the base member spacing it from said running board and having flanges for securing the hanger to the running board, brace members connecting the upright members and the flanges, a transverse strap secured to the base member, an arm hingedly secured to said strap, and a horizontal rod supported by said arm and provided with means to secure it to the angular brace members and to the container.

In witness whereof I affix my signature.

JAMES R. MOORE.